(12) United States Patent
Kissa

(10) Patent No.: US 8,463,081 B1
(45) Date of Patent: Jun. 11, 2013

(54) OPTICAL PHASE MODULATOR

(75) Inventor: Karl Kissa, West Simsbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 81 days.

(21) Appl. No.: 13/316,179

(22) Filed: Dec. 9, 2011

(51) Int. Cl.
*G02F 1/035* (2006.01)
*G02F 1/295* (2006.01)
*G02F 1/01* (2006.01)
*G02F 1/03* (2006.01)
*G02B 6/12* (2006.01)
*G02B 6/26* (2006.01)

(52) U.S. Cl.
USPC ............ 385/3; 385/2; 385/8; 385/14; 385/15; 359/238; 359/245; 359/279

(58) Field of Classification Search
USPC .................... 385/1–3, 8, 14, 15, 45; 359/238, 359/245, 279
See application file for complete search history.

(56) References Cited

U.S. PATENT DOCUMENTS

| | | | |
|---|---|---|---|
| 4,871,226 A | 10/1989 | Courtney et al. | 385/14 |
| 5,917,628 A * | 6/1999 | Ooi et al. | 398/98 |
| 5,982,964 A | 11/1999 | Marx et al. | 385/42 |
| 2007/0116421 A1 | 5/2007 | Hendry et al. | 385/132 |
| 2009/0219545 A1 | 9/2009 | Feth | 356/460 |
| 2011/0158576 A1 | 6/2011 | Kissa et al. | 385/3 |

OTHER PUBLICATIONS

S. Ezekiel and H.J. Arditty, Fiber-Optic Rotation Sensors, Springer-Verlag, Berlin, 1982, pp. 23, 52-81, 102-110, 124-135.

* cited by examiner

*Primary Examiner* — K. Cyrus Kianni
*Assistant Examiner* — Hung Lam
(74) *Attorney, Agent, or Firm* — Matthew A. Pequignot; Pequignot + Myers LLC

(57) ABSTRACT

An optical phase modulator having a reduced time drift of an electro-optical response is disclosed. An optical waveguide exhibiting the electro-optic effect includes two serially coupled portions having opposite time drifts of magnitudes of their respective electro-optical responses. As a result, a time drift of an overall electro-optical response of the optical phase modulator is lessened.

21 Claims, 13 Drawing Sheets

OPTICAL PHASE MODULATOR

TECHNICAL FIELD

The present invention relates to electro-optical devices, and in particular to optical phase modulators and tunable interferometers based thereon.

BACKGROUND OF THE INVENTION

Optical phase modulators are used to control phase of optical signals in interferometers and other devices where optical phase is translated into signal power, for example in Mach-Zehnder modulators used in optical communications and Sagnac interferometers used in optical gyroscopes. Functioning of most optical phase modulators is based on so-called electro-optic effect, wherein refractive index of an electro-optic material depends on an external electric field. The electric field is usually created by applying a voltage to a pair of electrodes disposed on two sides of the electro-optic material. Light propagating in the electro-optic material undergoes a phase shift due to a change of the refractive index caused in the material by the voltage applied to the electrodes. To lower the operating voltage, an optical waveguide having a width of only a few microns is formed in the electro-optic material, and the electrodes for applying the electric field are placed in close proximity to the waveguide.

Referring to FIG. 1A, a prior-art Mach-Zehnder modulator 10 is shown as an example. The Mach-Zehnder modulator 10 includes an input port 11A, an input spatial filter waveguide 11B, a Y-splitter waveguide 12, branch waveguides 13 and 14, a Y-combiner waveguide 15, an output spatial filter waveguide 16B, and an output port 16A formed in a X-cut lithium niobate substrate 17 using an Annealed Proton Exchange (APE) method. The APE waveguides 11B, 12-15, and 16B are shown with thick solid lines. Electrodes 18 and 19 are used to create electric fields of opposing polarity in the branch waveguides 13 and 14. The branch waveguides 13 and 14, in conjunction with the electrodes 18 and 19, form two phase modulators creating optical phase delays of opposite sign, for doubling the phase delay effect. When a voltage is applied between the electrodes 18 and 19, the optical phase of light propagating in the branch waveguides 13 and 14 is modulated in a push-pull fashion. The output light power depends on the optical phase difference in the branch waveguides 13 and 14 and, therefore, depends on the voltage between the electrodes 18 and 19. Thus, the Mach-Zehnder modulator 10 can be used for modulating light or attenuating light in a controllable manner.

Referring to FIG. 1B, a prior-art Y-fed Balanced Bridge Modulator (YBBM) 20 is similar to the Mach-Zehnder modulator 10 of FIG. 1A, with a directional coupler 25 in place of the output Y-combiner 15. The directional coupler 25 is coupled through output spatial filter waveguides 21B and 22B to output ports 21A and 22A, respectively. Varying the relative optical phase of light propagating in the branch waveguides 13 and 14 results in controllable redistribution of light between the output ports 21A and 22A of the YBBM 20, which enables its use as a voltage-controlled variable splitter or routing switch.

Turning now to FIG. 1C, a prior-art Y-branch Dual Phase Modulator (YBDPM) 28 is similar to the YBBM 20 of FIG. 1B. No output coupler is used in the YBDPM 28, the phase modulated signals being directed by the branch waveguides 13 and 14 to the output spatial filter waveguides 21B, 22B and further to the output ports 21A, 22A, respectively. Electrode pairs 23-24 and 26-27 are used to change the optical phase of the light propagating in the branch waveguides 13 and 14. The top waveguide 13 and the top electrode pair 23-24 form a top optical phase modulator, and the bottom waveguide 14 and the bottom electrode pair 26-27 form a bottom optical phase modulator. The YBDPM 28 can be used in optical gyroscopes, by connecting a looped polarization-maintaining optical fiber to the output ports 21A and 22A. Applications of YBDPM for sensing rotation are described by S. Ezekiel and H. J. Arditty in Fiber-Optic Rotation Sensors, Springer-Verlag, Berlin, 1982, pp. 23, 52-81, 102-110, 124-135.

The APE waveguides 11B, 12-15, 16B, 21B, and 22B, shown in FIGS. 1A to 1C in thick solid lines, guide light of only one polarization and thus act as highly efficient polarizers. Polarizing property of APE optical waveguides is desirable in many applications.

Unfortunately, applications of variable splitters or attenuators where the splitting or attenuating ratio needs to be maintained constant over extended periods of time are hindered by time dependence of optical phase delay generated in the APE/lithium niobate waveguides 13, 14 upon prolonged application of DC voltage to the electrodes 18-19, 23-24, or 26-27. Referring to FIG. 2, the optical phase delay in degrees is plotted against time in minutes for the top optical phase modulator of the APE Mach-Zehnder modulator 10 of FIG. 1A, including the APE waveguide 13 and the electrodes 18 and 19 adjacent thereto. In FIG. 2, at the time of 0 minutes, a voltage V is applied between the electrodes 18 and 19. At the time of 10 minutes, the voltage V is reversed to −V. One can see that the optical phase does not stay constant but relaxes as a matter of minutes. The optical phase delay relaxes from −218 degrees to −188 degrees and from −125 degrees to −155 degrees in ten minutes. This drift is typical for modulators having APE waveguides formed in lithium niobate substrates.

Another known drawback of optical modulators having APE waveguides formed in lithium niobate substrates is associated with drift of electro-optical response in vacuum, due to instability of APE waveguides in vacuum. In US Patent Application Publication US2007/0116421, Hendry et al. passivated the waveguide surface to reduce vacuum sensitivity of APE waveguides. In US Patent Application Publication US2009/0219545, Feth partially replaced APE waveguides with waveguides obtained by titanium diffusion, herein termed "Ti diffusion waveguides". Ti diffusion waveguides do not exhibit a significant drift of the electro-optical response in vacuum.

Referring to FIG. 3A, a prior-art Mach-Zehnder modulator 30 has an input port 31A, an output port 36A, and Ti diffusion waveguides 31B, 32-35, 36B in place of the APE waveguides 11B, 12-15, 16B, respectively, of the Mach-Zehnder optical modulator 10 of FIG. 1A. The Ti diffusion waveguides 31B, 32-35, 36B are shown in FIGS. 3A and 3B in thick dotted lines. The Ti diffusion waveguides 31B, 32-35, 36B are not sensitive to vacuum; however they guide light of both polarizations, not just one polarization. To preserve the polarization selection property in the Ti diffusion Mach-Zehnder modulator 30, a waveguide portion 38 coupled to the input port 31A was formed using an APE method. The APE portion 38 is "stitched" to the Ti diffusion spatial filter waveguide 31B at a stitching location 37.

Referring now to FIG. 3B, a prior-art YBDPM 38 is similar to the YBDPM 28 of FIG. 1C, the difference being that the branch waveguides 33 and 34 are Ti diffusion waveguides stitched to the APE Y-splitter 12 and to the output spatial filter waveguides 21B, 22B at the stitching locations 37. Ti diffusion branch waveguides 33 and 34 make the YBDPM 28 much less sensitive to vacuum.

Since APE and Ti diffusion waveguides are formed at different temperatures (approximately 300 to 400° C. and 1000 to 1050° C., respectively), they can be formed in different process steps, starting with forming Ti diffusion waveguides at approximately 1000 to 1050° C., and then forming APE waveguides at approximately 300 to 400° C. This process has been disclosed in U.S. Pat. No. 5,982,964 by Marx et al. For both the Mach-Zehnder modulator 30 FIG. 3A and the YBDPM 38 of FIG. 3B, the alignment of APE and Ti diffusion waveguides at the stitching locations 37 is ensured by careful alignment of photolithographic masks used in the APE and Ti processes to manufacture the Mach-Zehnder modulator 30 and the YBDPM 38. For the APE waveguides 38, 11B, 12, 21B, and 22B, a photolithographic mask is used to create narrow openings in a layer of deposited metal, such as aluminum (Al) or titanium (Ti). The patterned metal then functions as a proton exchange (PE) mask. The PE step is followed by an annealing step, for diffusing the protons deeper into the substrate 17. For the Ti waveguides 31B, 32 to 35, and 36B, a photolithographic mask is used to create a pattern of narrow stripes in a deposited layer of Ti, which then diffuse into the substrate in a diffusion furnace, creating the Ti waveguides. There are no intentional offsets or gaps between Ti and APE waveguides at the stitching locations 37.

Turning to FIG. 4, the optical phase delay in degrees is plotted against time in minutes for the top optical phase modulator of the Ti diffusion Mach-Zehnder modulator 30 of FIG. 3A having the Ti diffusion waveguide 33 between the adjacent electrodes 18 and 19. In FIG. 4, at time of 0 minutes, the voltage V is applied between the electrodes 18 and 19. At time of 10 minutes, the voltage V is reversed to −V. One can see that the optical phase does not stay constant but increases from −200 degrees to −225 degrees and from −165 degrees to −140 degrees in 10-minute time intervals. Thus, Ti diffusion waveguide-based Mach-Zehnder modulator 30, although insensitive to vacuum, also exhibits drift of optical phase upon application of a constant voltage. The time drift of optical phase delay generated by the APE and Ti diffusion waveguide-based modulators 10 and 30 and YBBM 28 and 38, respectively, is highly detrimental and limits areas of their applications.

It is a goal of the present invention to provide a stable optical phase modulator, in which both the vacuum sensitivity and the time drift of the generated optical phase difference would be substantially reduced.

SUMMARY OF THE INVENTION

According to the invention, an optical phase drift of an optical phase modulator can be lessened by combining on a single substrate waveguides of two types. An electrode structure is provided to create an electrical field in the waveguides of both types. The waveguides have, in conjunction with the electrode structure, opposite drifts of the electro-optical responses when an electrical field is applied to the waveguides. A positive drift of a waveguide of one type is compensated by a negative drift of a waveguide of the other type. In one embodiment, an Annealed Proton Exchange (APE) waveguide stitched to a Ti diffusion waveguide is disposed between a common pair of electrodes. A ratio of lengths of these two waveguides may be adjusted to further reduce thermal drift of the overall electro-optical coefficient of the optical phase modulator. Electrode gap, as well as a percentage of applied voltage, can also be adjusted or varied as required.

In accordance with the invention there is provided an optical phase modulator for modulating phase of an optical signal propagating therein, the optical phase modulator comprising an electro-optical substrate and an optical waveguide formed thereon or therein for guiding the optical signal. The optical waveguide comprises first and second waveguide portions optically coupled in series at a first stitch point, wherein the first and second waveguide portions comprise first and second materials, respectively. The optical phase modulator further comprises an electrode structure formed on or in the electro-optical substrate for creating an electric field in the first and second waveguide portions for modulating the phase. The first and second waveguide portions are characterized, in conjunction with the electrode structure, by first and second time drifts of magnitudes of their respective electro-optical responses when the electrical field is applied by the electrode structure to the first and second waveguide portions. The first and second time drifts are of opposite sign, whereby the time drift of the first waveguide portion at least partially compensates the time drift of the second waveguide portion. As a result, a time drift of an overall electro-optical response of the optical phase modulator is lessened.

In one embodiment, the optical waveguide further comprises a third waveguide portion optically coupled in series with the first and the second waveguide portions at a second stitch point, wherein the third waveguide portion comprises a third material. The electrode structure is configured for creating an electric field in the third waveguide portion for modulating phase. The third waveguide portion is characterized, in conjunction with the electrode structure, by a time drift of a magnitude of its electro-optical response, of an opposite sign than the time drift of the magnitude of the electro-optical response of the first waveguide portion. The time drift of the electro-optical response of the first waveguide portion is characterized by first and second time constants. The time drifts of the electro-optical response of the second and third waveguide portions are characterized by third and fourth time constants, respectively, substantially equal in magnitude to the first and second time constants, respectively, of the time drift of the electro-optical response of the first waveguide portion. As a result, the time drift of the overall electro-optical response of the optical phase modulator is further lessened.

The electrode network can include a resistive and/or capacitive and/or reactive voltage divider for dividing a voltage of the source of the electrical signal according to a ratio of lengths of the first and second waveguide portions and/or electrode gap widths at the first and second waveguide portions, so as to further reduce the time drift of the overall electro-optical response of the optical phase modulator. Temperature variable components can be used for reducing thermal dependence of the overall electro-optical response of the optical phase modulator.

In accordance with the invention, there is further provided a Y-branch dual phase optical modulator, a Mach-Zehnder optical interferometer, and a Y-fed balanced bridge optical modulator comprising first and second arms, at least one arm and preferably each arm including an embodiment of the optical phase modulator described above.

In accordance with the invention, there is further provided a method of modulating phase of an optical signal, comprising:

(a) providing an electro-optical substrate;
(b) forming and an optical waveguide on or in the substrate for guiding the optical signal, including first and second waveguide portions optically coupled in series at a first stitch point, wherein the first and second waveguide portions comprise first and second materials, respectively;

(c) forming an electrode structure on or in the electro-optical substrate for creating an electric field in the first and second waveguide portions for modulating the phase, wherein the first and second waveguide portions are characterized, in conjunction with the electrode structure, by first and second time drifts of magnitudes of their respective electro-optical responses when the electric field is applied by the electrode structure to the first and second waveguide portions; and wherein the first and second time drifts are of opposite sign, whereby the time drift of the first waveguide portion at least partially compensates the time drift of the second waveguide portion, thereby lessening a time drift of an overall electro-optical response of the optical phase modulator.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

To better explain the invention and highlight advantages offered thereby, time drifts of electro-optical responses of prior-art APE- and Ti-diffusion waveguide optical phase modulators will be considered in more detail first.

The time drift of an electro-optical response of a prior-art APE waveguide optical phase modulator has been characterized by applying multiple voltage steps of different durations to the modulator's electrodes; measuring the resulting optical phase increments as a function of time; taking a Fourier transform of the optical phase measurements to obtain the optical phase as a function of frequency; and taking an inverse value of the frequency dependence of the optical phase. The inversed frequency dependence is proportional to so-called π-voltage (Vπ) frequency dependence. The π-voltage Vπ is a voltage required to generate a phase shift of π, or 180 degrees. The measurement and the accompanying calculations have been repeated at a number of temperatures, for both APE-waveguide and Ti-diffusion waveguide prior-art optical phase modulators.

Figure 5:
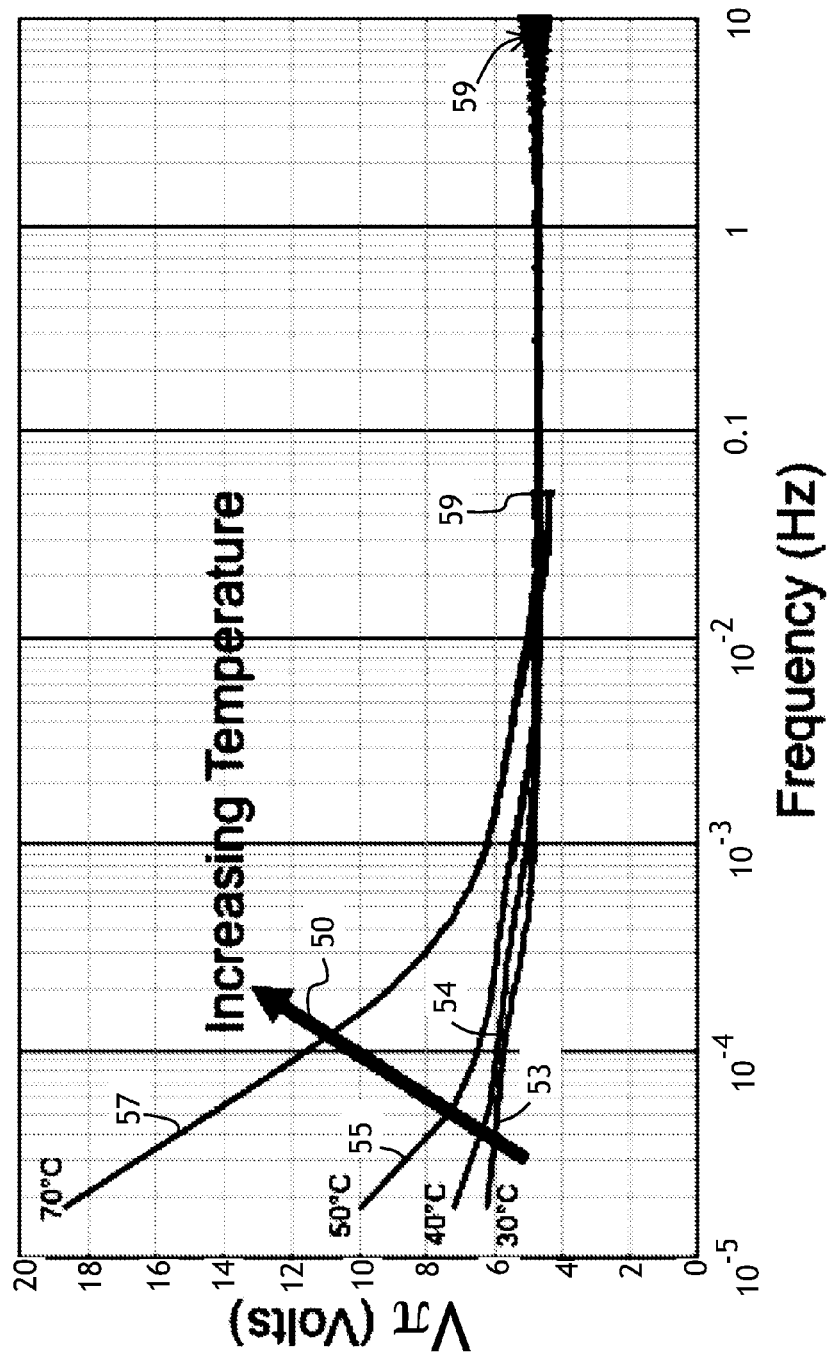
FIGS. 5 and 6 are plots of frequency vs. time illustrating the frequency dependences of π-voltages Vπ of APE and Ti-diffusion optical phase modulators, respectively.

Referring to FIG. 5, π-voltage frequency dependences of a prior-art APE-waveguide optical phase modulator at temperatures of 30° C., 40° C., 50° C., and 70° C. are presented at 53, 54, 55, and 57, respectively. Periodic voltage steps at 0.1 and 90 Hz were applied to the modulator's electrodes. Kinks/oscillations 59 are artifacts due to the Fourier transform of the original measurements at 0.1 Hz and 90 Hz. In FIG. 5, Vπ generally increases with temperature, as indicated by an arrow 50, and decreases with frequency. The magnitude of the decrease of Vπ with frequency becomes larger as the temperature is increased. At 70° C., Vπ is about 3 times larger at $10^{-5}$ Hz as compared to Vπ at 1 Hz, which corresponds to a 3 times decrease in modulation strength at low frequencies, because the modulation strength is approximately inversely proportional to Vπ.

Figure 6:
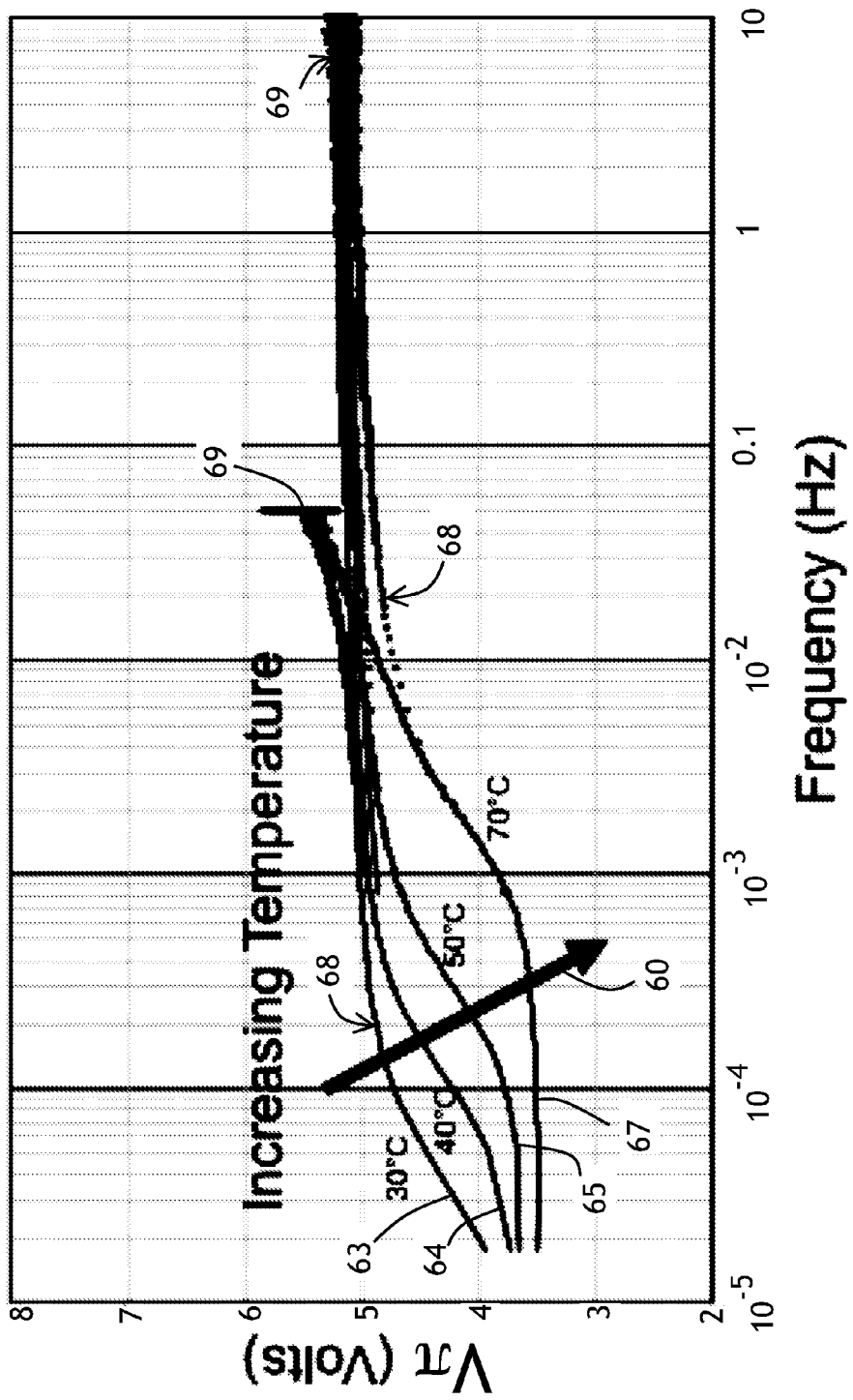

Turning to FIG. 6, π-voltage frequency dependences of a prior-art Ti-diffusion waveguide optical phase modulator at temperatures of 30° C., 40° C., 50° C., and 70° C. are presented at 63, 64, 65, and 67, respectively. Voltage steps at 0.1 and 90 Hz were applied to the modulator's electrodes. Kinks/oscillations 69 are artifacts due to Fourier transform of the original measurements at 0.1 and 90 Hz. Vπ generally decreases with temperature as shown by an arrow 60, and increases with frequency. At the frequency of 1 Hz, Vπ is as much as 40% larger than at the frequency of $10^{-5}$ Hz, at the temperature of 70° C. At the temperature of 30° C., a knee 68 is present at approximately $2 \times 10^{-4}$ Hz. The knee 68 moves to higher frequencies as temperature is increased, reaching a frequency of about 0.02 Hz at 70° C.

Figure 7:
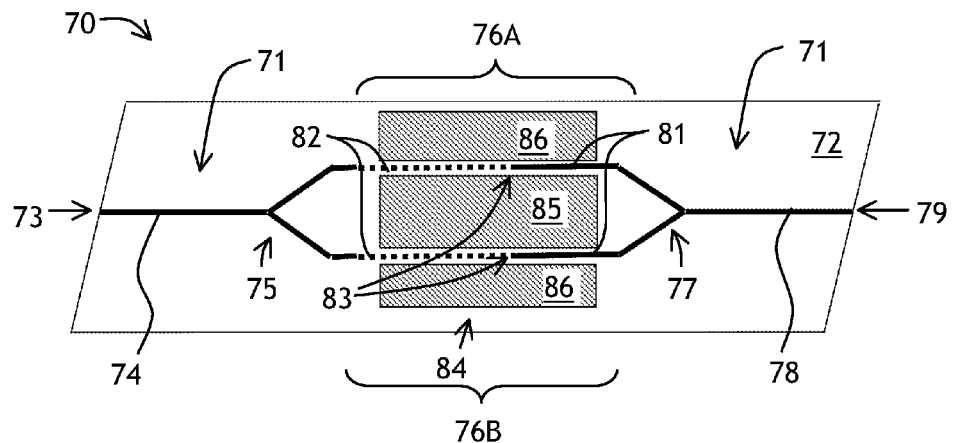
FIGS. 7 and 8 are plan views of a Mach-Zehnder optical modulator and a YBDPM, respectively, according to the invention.

Referring now to FIG. 7, a waveguide Mach-Zehnder optical modulator 70 of the invention has an optical waveguide 71 formed in an electro-optical substrate 72. The optical waveguide 71 is shown in FIG. 7 in thick solid and dotted lines. The waveguide Mach-Zehnder optical modulator 70 includes an input port 73, an input spatial filter 74, a Y-splitter 75, two phase modulators 76A and 76B, a Y-combiner 77, an output spatial filter 78, and an output port 79. Each phase modulator 76A and 76B includes first 81 and second 82 optical waveguide portions shown in solid and dotted lines, respectively, optically coupled in series at a stitch point 83, and an electrode structure 84 on the substrate 72. The stitch points 83 are locations where the first 81 and second 82 optical waveguide portions are coupled to each other. The electrode structure 84 includes electrodes 85 and 86 for creating an electric field in the first and second waveguide portions 81 and 82, respectively, for modulating the phase of an optical signal propagating in each of the phase modulators 76A and 76B. The stitch points 83 are disposed between the electrodes 85 and 86.

In the embodiment shown, the first and the second waveguide portions 81 and 82 are APE and Ti diffusion waveguides, respectively, formed in the lithium niobate substrate 72. As explained above, the APE and Ti diffusion waveguides 81 and 82 are characterized, in conjunction with the electrode structure 84, by time drifts of magnitudes of their respective electro-optical responses when the electrical field is created by the electrode structure 84 in both the first and the second waveguide portions 81 and 82. The time drifts are of opposite signs. Herein, the term "time drifts of opposite signs" means that as a magnitude of one electro-optical response increases with time, a magnitude of the other one decreases, and vice versa.

Due to the opposite signs of the time drifts of magnitudes of the electro-optical responses of the first and second waveguide portions 81 and 82, the time drift of the first waveguide portion 81 at least partially compensates the time drift of the second waveguide portion 82, thereby lessening a time drift of the overall electro-optical response of each of the optical phase modulators 76A and 76B. In each of the optical phase modulators 76A and 76B, the drift of the overall electro-optical response is lessened. As a result, the overall electro-optical response drift of the entire Mach-Zehnder optical modulator 70 is considerably reduced. A 40% or greater variation of a magnitude of an electro-optic response with time and temperature can be reduced to about a 15% to 20% variation of the magnitude of the response.

Figure 1A:
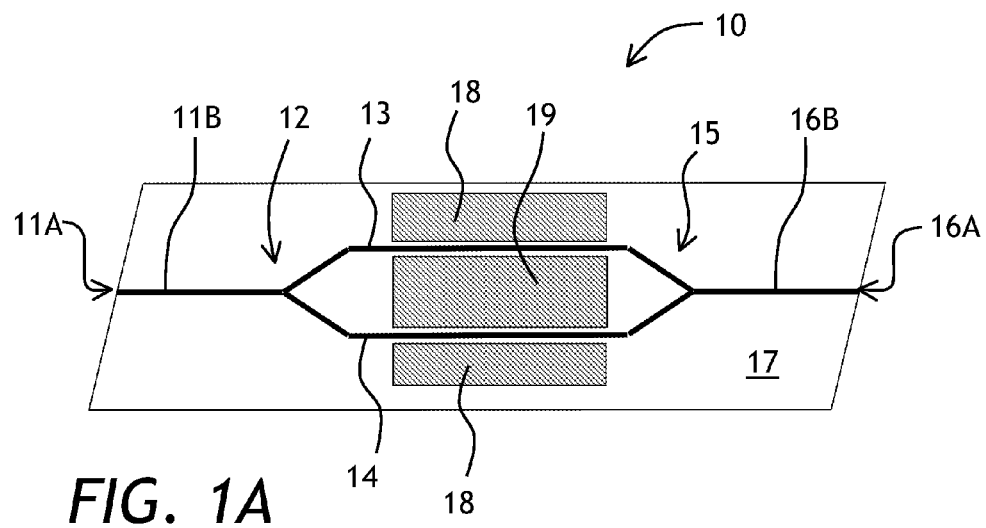
FIGS. 1A to 1C are plan views of a prior-art Mach-Zehnder optical modulator, a prior-art Y-fed Balanced Bridge Modulator (YBBM), and a prior-art Y-branch Dual Phase Modulator (YBDPM), respectively, formed with APE waveguides in a lithium niobate substrate.
Figure 1B:
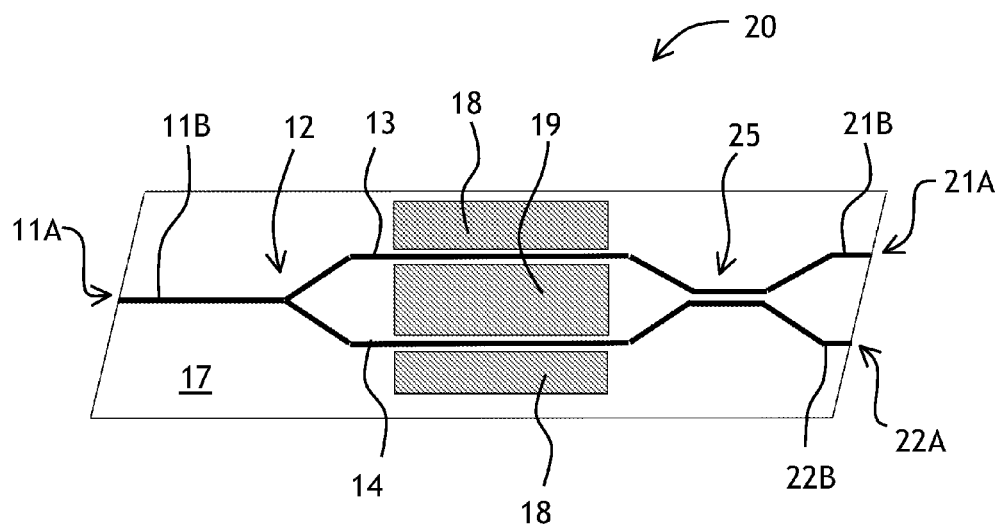
Figure 1C:
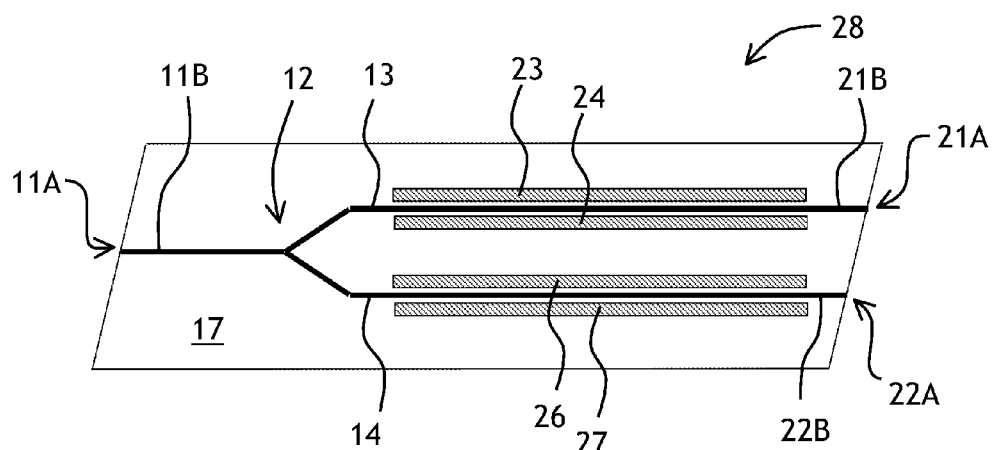
Figure 2:
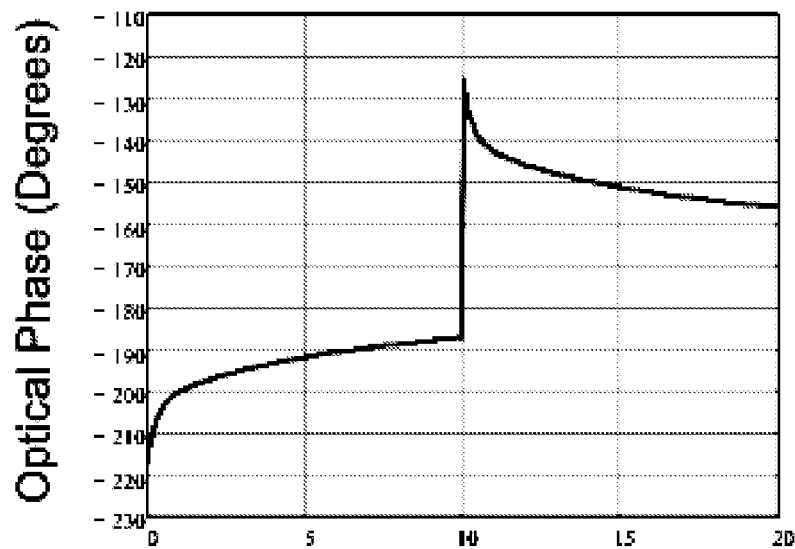
FIG. 2 is a plot of optical phase vs. time illustrating the time dependence of optical phase delay generated by a prior-art APE-waveguide optical phase modulator, showing a gradual relaxation of the generated optical phase delay.
Figure 3A:
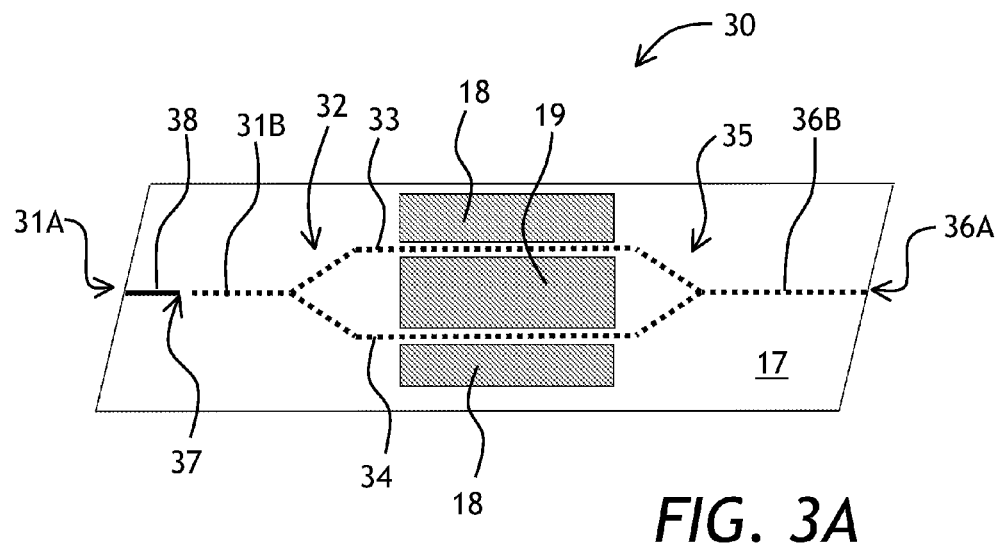
FIGS. 3A and 3B are plan views of a prior-art Mach-Zehnder optical modulator and a prior-art YBDPM, respectively, formed with Ti-diffusion waveguides in a lithium niobate substrate.
Figure 3B:
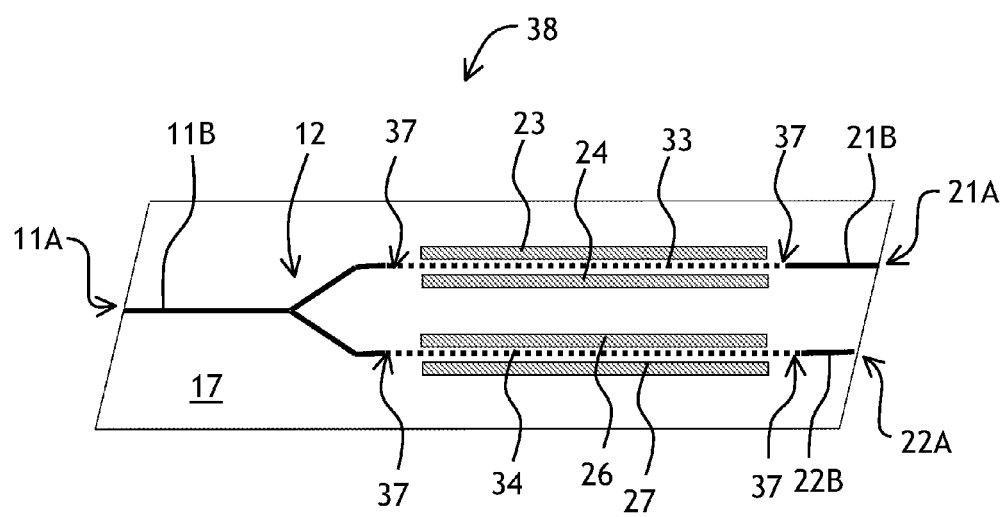
Figure 4:
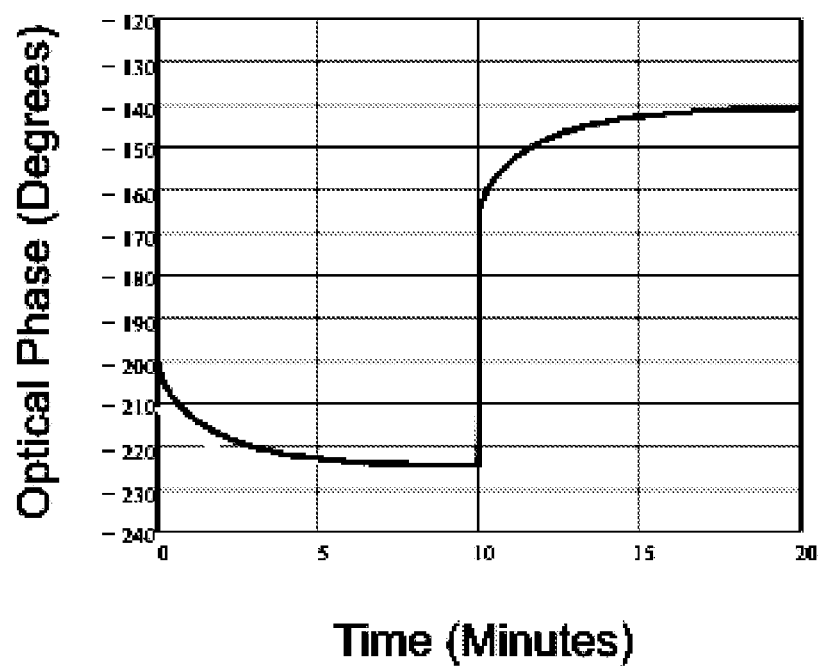
FIG. 4 is a plot of optical phase vs. time illustrating a time dependence of optical phase delay generated by a Ti-diffusion waveguide optical phase modulator, showing a gradual increase of the generated optical phase delay.

Waveguide portions exhibiting electro-optical response drifts of opposite signs can be used to reduce response drifts in any waveguide-based electro-optical device. By way of another example, referring to FIG. 8, a Y-branch Dual Phase Modulator (YBDPM) 88 includes the optical phase modulators 76A and 76B. The YBDPM 88 includes the input port 73, the input spatial filter 74, the Y-splitter 75, two phase modulators 76A and 76B, two output spatial filters 78A and 78B, and two output ports 79A and 79B coupled to the output spatial filters 78A and 78B, respectively. The optical waveguide portions 81 and 82 are stitched at the stitch points 83. Both optical waveguide portions 81 and 82 and the stitch points 83 are disposed in gaps between the electrodes 85 and 86. Due to the electro-optical response drifts in the optical waveguides portions 81 and 82 compensating each other as explained above, the overall variation of $V\pi$ of the top and bottom optical phase modulators 76A and 76B of the YBDPM 88 over frequency and temperature is considerably lessened. It is noted that, due to presence of vacuum-insensitive Ti-diffusion waveguide portions 82, the vacuum sensitivity of the Mach-Zehnder optical modulator 70 and the YBDPM 88 of FIGS. 7 and 8, respectively, is also reduced as compared to the case of all-APE prior-art Mach-Zehnder optical modulator 10 and all-APE prior-art YBDPM 28 of FIGS. 1A and 1C, respectively.

Figure 9:
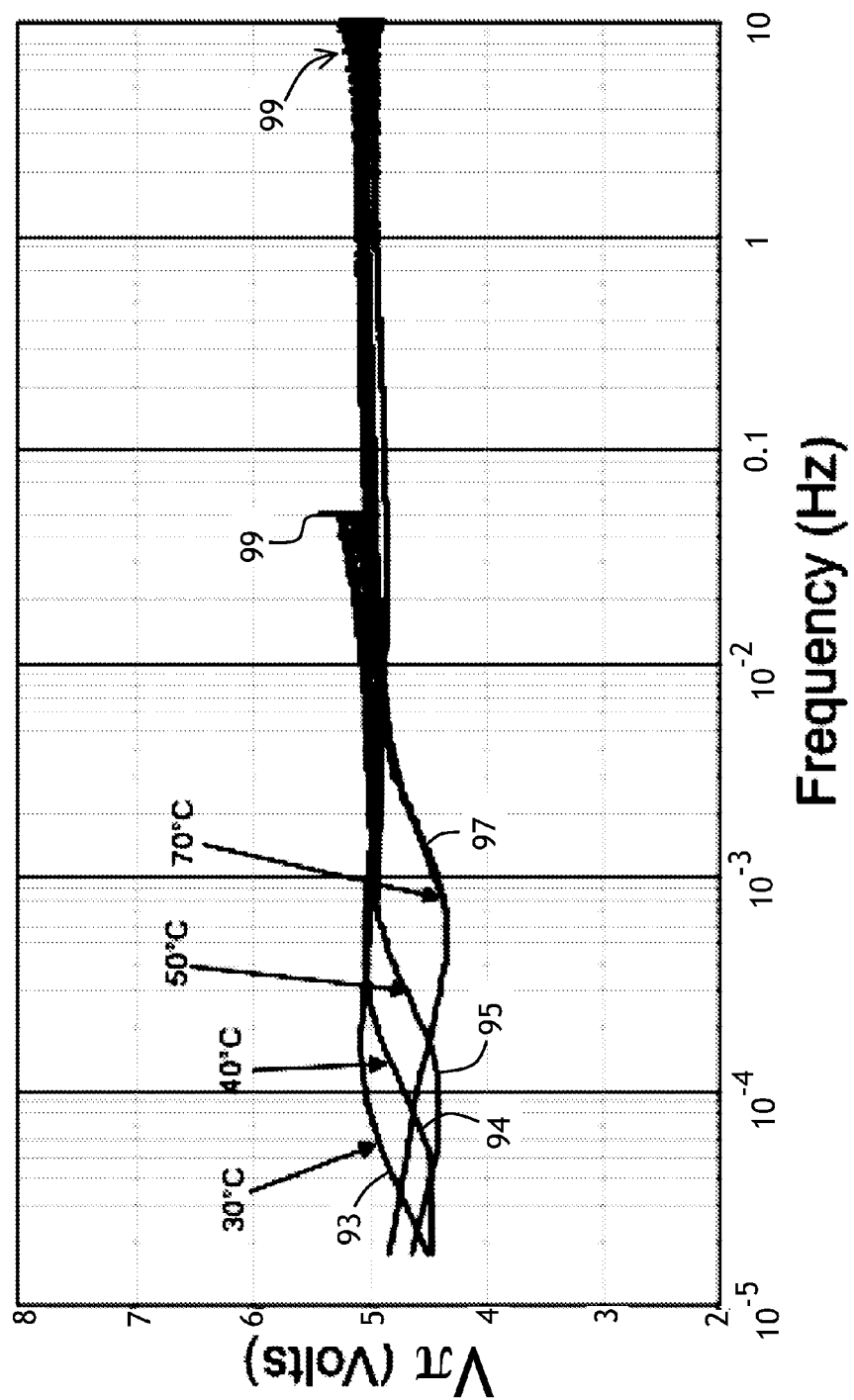
FIGS. 9 and 10 are plots of frequency vs. time illustrating the frequency dependences of π-voltages of optical phase modulators of the Mach-Zehnder modulator and YBDPM of FIGS. 7 and 8 at 40%/60% and 30%/70% APE/Ti diffusion waveguide lengths ratios, respectively.

The time drift of the electro-optical response of the optical phase modulators 76A and 76B of FIG. 7 has been simulated by calculating a weighted sum of the frequency dependences of FIGS. 5 and 6. The magnitudes of the electro-optic responses for Ti and APE waveguides, as given by $1/V\pi$, are summed together with weighting coefficients. The inverse of the weighted sum is then calculated to determine the net $V\pi$ dependence vs. frequency. Referring to FIG. 9, $V\pi$ frequency dependences of the optical phase modulators 76A and 76B at temperatures of 30° C., 40° C., 50° C., and 70° C. are presented at 93, 94, 95, and 97, respectively. Kinks/oscillations 99 are artifacts due to Fourier transform of the original measurements at 0.1 Hz and 90 Hz. A ratio of lengths of the first and second waveguide portions 81 and 82 is 4:6. In other words, the APE waveguides 81 are 40% of the total length, and the Ti diffusion waveguides 82 are 60% of the total length of branch waveguides between the electrodes 85 and 86. The dependences 93, 94, 95, and 97 have been calculated by taking a weighted average including 40% of the APE $V\pi$ frequency dependences 53, 54, 55, and 57 and 60% of the Ti diffusion $V\pi$ frequency dependences 63, 64, 65, and 67 of FIGS. 5 and 6, respectively. In FIG. 9, $V\pi$ is within 15% of the value of approximately 5V at frequencies between $10^{-5}$ Hz and 10 Hz and temperatures between 30° C. and 70° C., which is a considerable improvement of $V\pi$ stability over the prior art.

Figure 10:
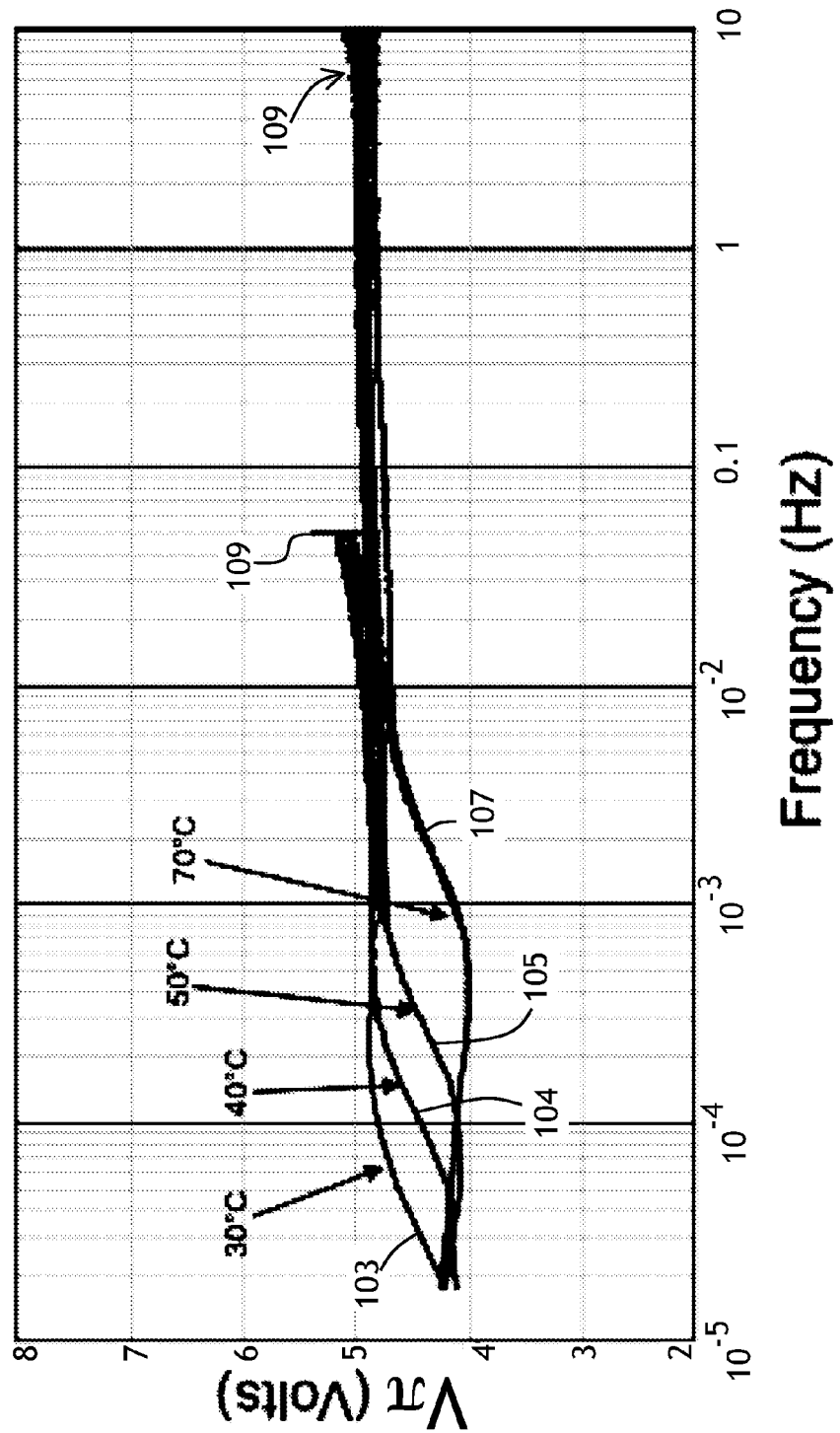

The amount of variation of $V\pi$ with frequency can be traded off against a vacuum sensitivity of the optical phase modulators 76A and 76B, by reducing the length percentage of the APE waveguide 81 causing the vacuum sensitivity. Turning to FIG. 10, $V\pi$ frequency dependences of the optical phase modulators 76A and 76B are presented at 103, 104, 105, and 107 for the temperatures of 30° C., 40° C., 50° C., and 70° C., respectively, for 30%/70% APE/Ti diffusion waveguides length ratio. Kinks/oscillations 109 are artifacts due to Fourier transform of the original measurements at 0.1 Hz and 90 Hz. The $V\pi$ frequency dependences 103, 104, 105, and 107 have been calculated by taking 30%/70% weighted average of the APE waveguide $V\pi$ frequency dependences 53, 54, 55, and 57 and the Ti diffusion waveguide $V\pi$ frequency dependences 63, 64, 65, and 67 of FIGS. 5 and 6, respectively. In FIG. 10, $V\pi$ is within 20% of approximately 5V at frequencies between $10^{-5}$ Hz and 10 Hz and temperatures between 30° C. and 70° C., while the vacuum sensitivity is further reduced as compared to the case shown in FIG. 9.

The invention can be used with different types/materials of the waveguide 71 and/or the substrate 72. The waveguides 71 can be diffusion-type waveguides, that is, waveguides formed by diffusion of protons (for APE waveguides), titanium ions (for Ti diffusion waveguides), or other suitable different materials into the substrate 72, or they can be formed within a separate layer supported by the substrate 72. It is important to select the first and second waveguide portions 81 and 82 having time drifts of electro-optical responses of opposite signs. The substrate 72 can include $LiNbO_3$, $MgO:LiNbO_3$, InP, and GaAs. These are only a few examples of usable substrates. For the material system including APE/Ti diffusion waveguides, it is recommended that the APE/Ti diffusion waveguide length ratio should not exceed 1:1, and preferably it should not exceed 4:6. Where an improved vacuum stability is desired, the APE/Ti diffusion waveguide length ratio should not exceed 3:7. Herein, the term "length" means an active length, or a length across which the electric field is created by the electrodes 85, 86 upon application of the voltage to the electrodes 85, 86.

An optical phase modulator of the invention can include not two but three or more serially coupled different waveguide portions having different time drifts of the electro-optical response. In operation, the electrode structure creates an electric field throughout all three waveguide portions. The third waveguide portion is characterized, in conjunction with the electrode structure, by a time drift of a magnitude of its electro-optical response, of an opposite sign than the time drift of the magnitude of the electro-optical response of the first waveguide portion. The time drift of the electro-optical response of the first waveguide portion is characterized by first and second time constants, for example by fast and slow time constants of a non-exponential time drift. The time drifts of the electro-optical response of the second and third waveguide portions are characterized by third and fourth time constants, respectively. The third and fourth time constants are selected to be substantially equal, or at least similar in magnitude to the first and second time constants, respectively, of the time drift of the electro-optical response of the first waveguide portion. Since the first waveguide portion has a drift of opposite sign than the second and the third portions, the time drift of the overall electro-optical response of the optical phase modulator is further lessened. By way of example, the three waveguide types can include titanium diffusion, APE, and MgO-doped indiffused titanium.

Figure 8:
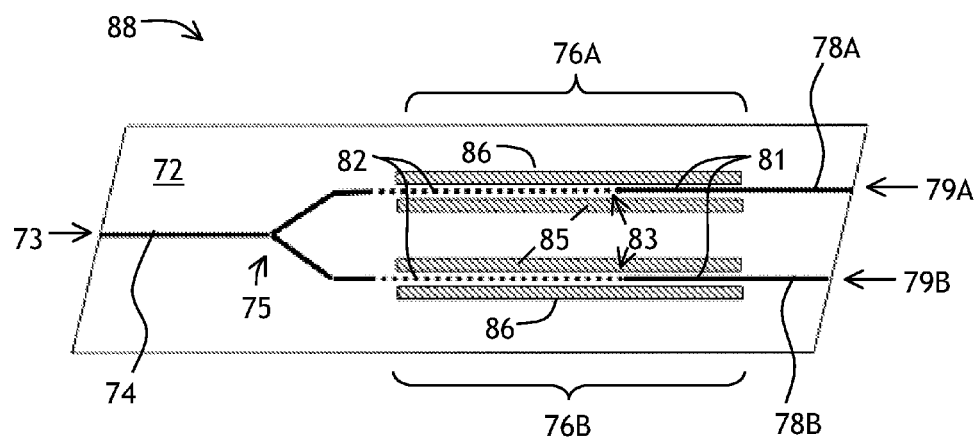
Figure 11:
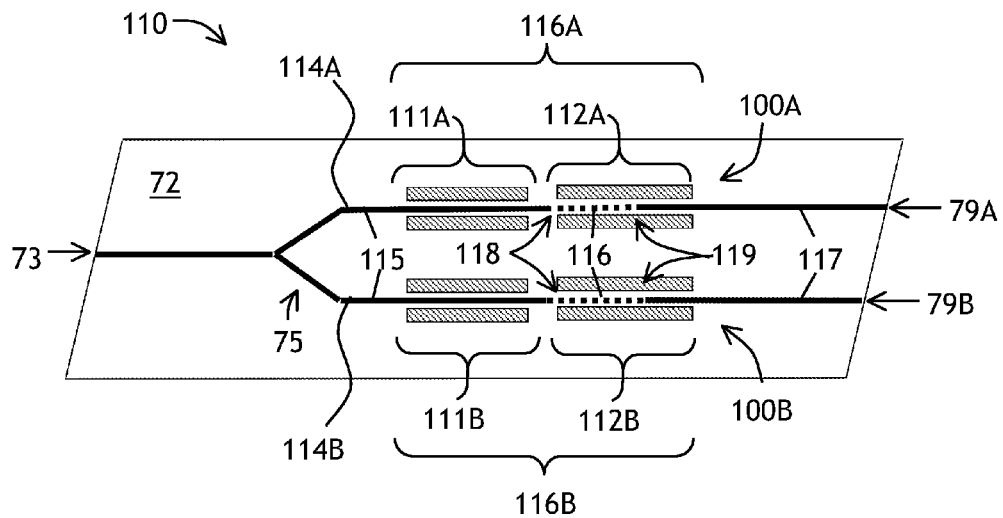
FIGS. 11 to 13 are plan views of various embodiments of YBDPM of the invention.
Figure 12:
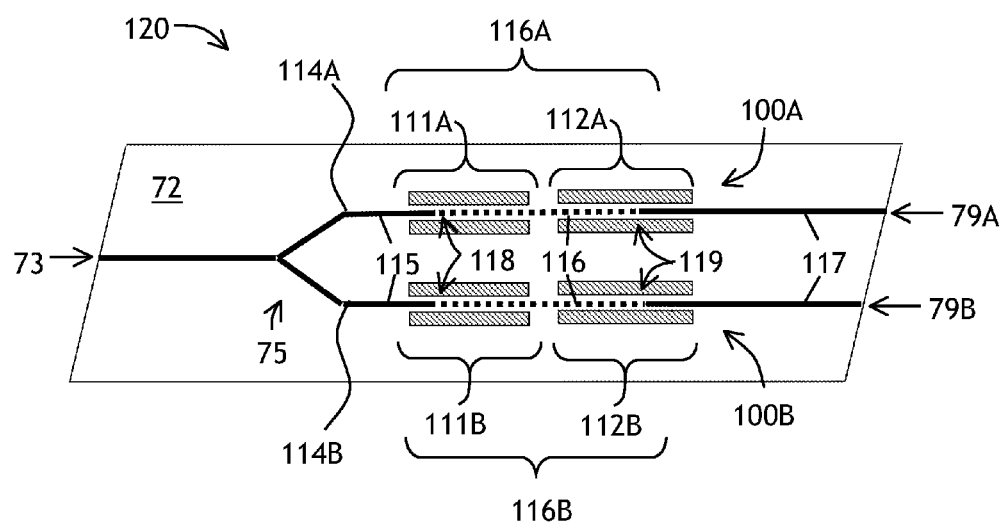
Figure 13:
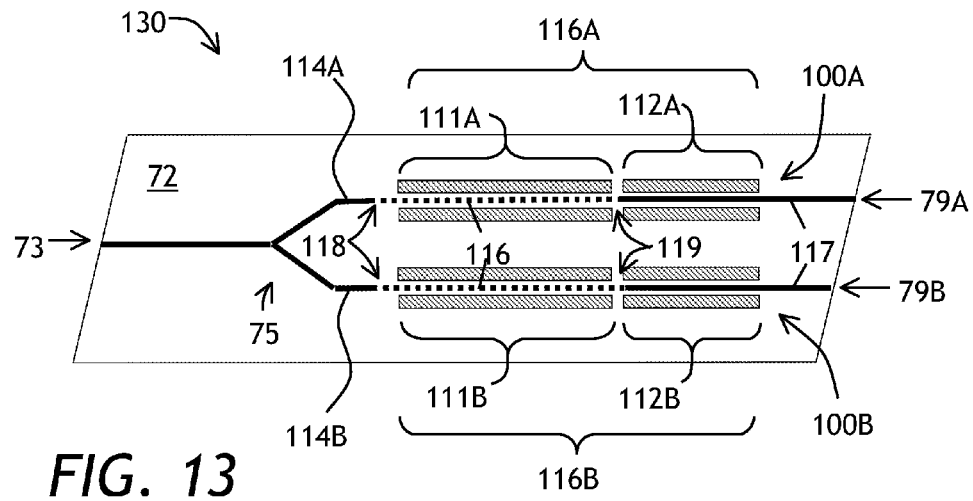

Turning now to FIGS. 11 to 13, YBDPM 110, 120, and 130 of the invention are similar to the YBDPM 88 of FIG. 8, the difference being that top and bottom electrode structures 100A and 100B of top and bottom optical phase modulators 116A and 116B, respectively, include first and second separate electrode portions 111A/112A and 111B/112B, respectively, disposed end-to-end along respective top and bottom branch waveguides 114A and 114B. Each branch waveguide 114A and 114B includes three waveguide portions coupled in series: a leftmost portion 115, a middle portion 116, and a rightmost portion 117. The waveguide portions 115, 116, and 117 are stitched at first and second stitch points 118 and 119, respectively. Referring specifically to FIG. 11 showing the YBDPM 110, the first stitching points 118 are disposed between the first and the second electrode portions 111A/112A and 111B/112B, respectively, of the electrode structures 100A and 100B. The second stitching points 119 are disposed within the second electrode portions 112A and 112B of the respective electrode structures 100A and 100B. The first electrode portions 111A, 111B of the electrode structures 100A and 100B create an electric field in 100% APE waveguides, while the second electrode portions 112A, 112B create an electric field in 60% Ti diffusion and 40% APE waveguides. Referring specifically to FIG. 12 showing the YBDPM 120, the first stitching points 118 are disposed within the first electrode portions 111A and 111B of the respective electrode structures 100A and 100B. The first and second electrode portions 111A and 112A, 111B and 112B of the electrode structures 100A and 100B, respectively, create an electric field in 20% APE and 80% Ti diffusion waveguides, and 40% APE and 60% Ti diffusion waveguides, respectively. Finally, referring specifically to FIG. 13 showing the YBDPM 130, both the first and the second stitching points 118 and 119 are disposed outside the first and second separate electrode portions 111A/112A and 111B/112B of the electrode structures 100A and 100B, respectively, so the fraction of APE/Ti diffusion waveguides is directly determined by the relative length of the electrodes 111A and 112A, or 111B and 112B.

In the YBDPM 110, 120, and 130 of FIGS. 11 to 13, the leftmost and the rightmost waveguide portions 115 and 117 are APE waveguides, and the middle portions 116 are Ti diffusion waveguides, although three different waveguide types can be used. Splitting electrode structures 100A, 100B into the first and second electrode portions 111A/112A and 111B/112B allows for independent adjustment of voltages applied to the first and second electrode portions 111A/112A and 111B/112B, thus providing a possibility of adjusting electric field magnitudes in respective APE/Ti diffusion waveguide portions. This provides additional degrees of freedom of compensating time drift of the electro-optic response.

Figure 14:
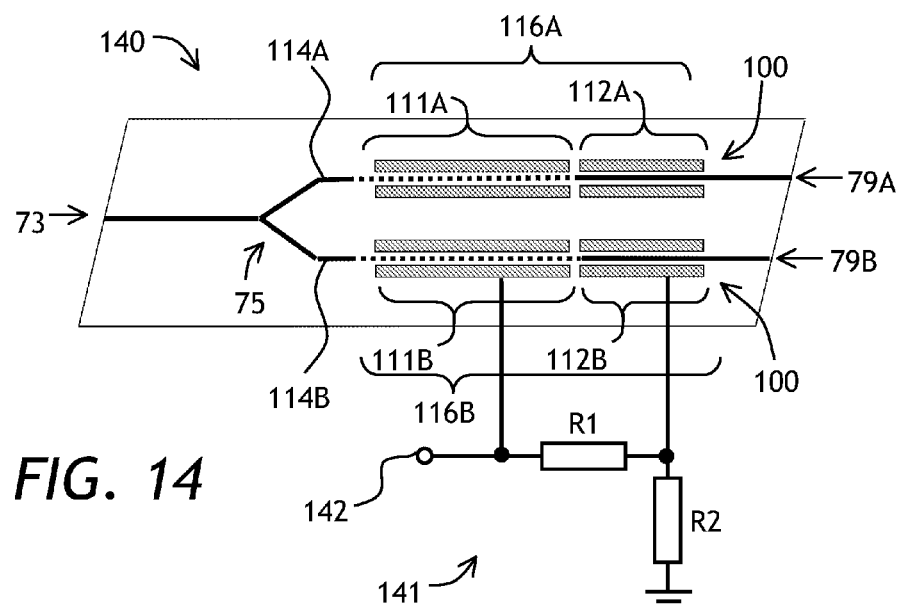
FIG. 14 is a view of the YBDPM of FIG. 13 having a resistive network for applying the driving voltage.

Referring to FIG. 14, a YBDPM 140 includes the top and bottom optical phase modulators 116A and 116B, respectively, each having a split electrode structure. An electrical network 141 couples first and second electrode portions 111B and 112B of the split structure of the bottom optical phase modulator 116B to each other and to a source 142 of a driving electrical signal. A similar electrical network for the top optical phase modulator 116A is not shown for clarity. The electrical network 141 is a resistive voltage divider including resistors R1 and R2. The driving voltage applied to the second electrode portion 112B is R2/(R1+R2) times smaller than the driving voltage applied to the first electrode portion 111B. The driving voltage splitting afforded by the electrical network 141 is useful in cases where different waveguide types have different magnitudes of electro-optical response.

Figure 15:
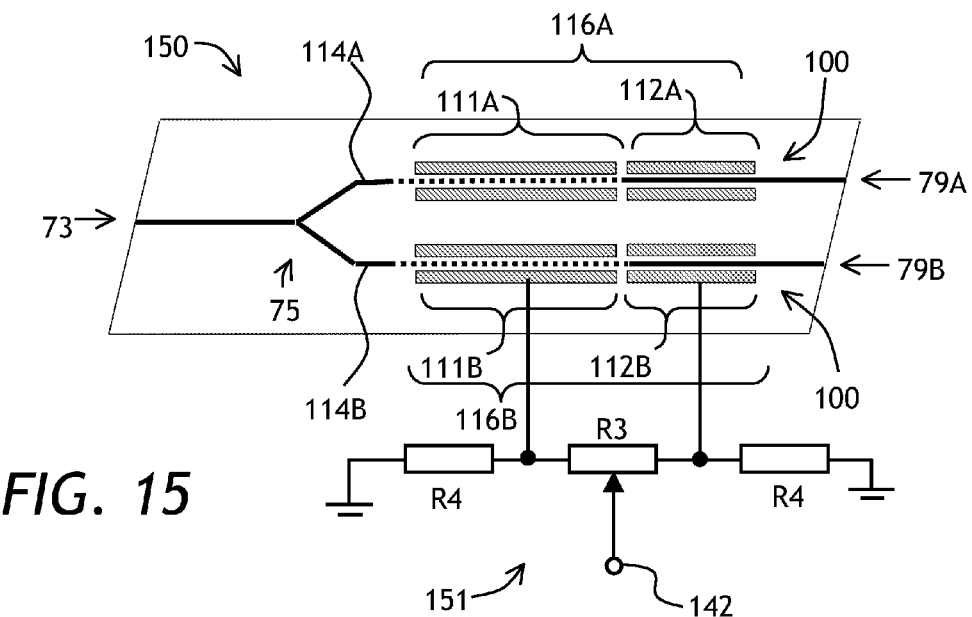
FIGS. 15 and 16 are views of the YBDPM of FIG. 13 having a variable resistive/capacitive network for applying the driving voltage.

Turning to FIG. 15, a YBDPM 150 is similar to the YBDPM 140 of FIG. 14, the difference being that a resistive network 151 includes a variable resistor R3 serially coupled between two constant resistors R4. The resistive network 151 allows the voltage of the source 142 to be redistributed in a variable fashion. This allows for shaping of the electro-optical response at a calibration stage, to account for manufacturing process variability.

Figure 16:
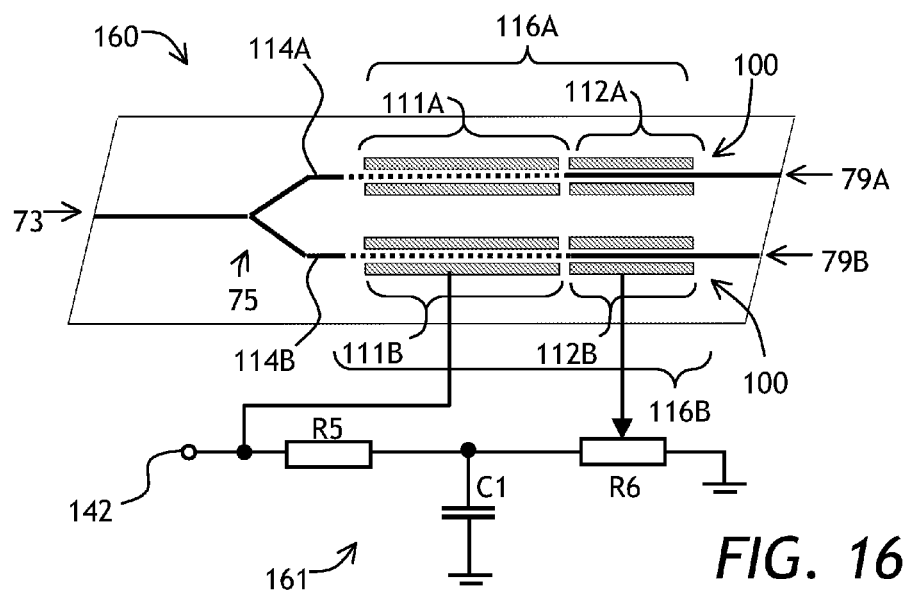

Referring to FIG. 16, a YBDPM 160 is similar to the YBDPM 150 of FIG. 15. An electrical network 161 of the YBDPM 160 includes an RC circuit including a resistor R5 and a capacitor C1, and a variable resistor R6 coupled in parallel to the capacitor C1. The resistive network 161 allows a low-frequency component of the voltage of the source 142 to be applied to the second electrode portion 112B of the electrode structure of the second phase modulator 116B in a variable fashion. This allows one to match different electrical bandwidths of the electro-optical responses of the two electrode portions of the second phase modulator 116B. The electrical network 161 can include an inductance, a high pass filter, a low pass filter, and/or a bandpass filter, for properly matching the electrical bandwidths of the electro-optical responses of the two portions of the second phase modulator 116B.

Figure 17:
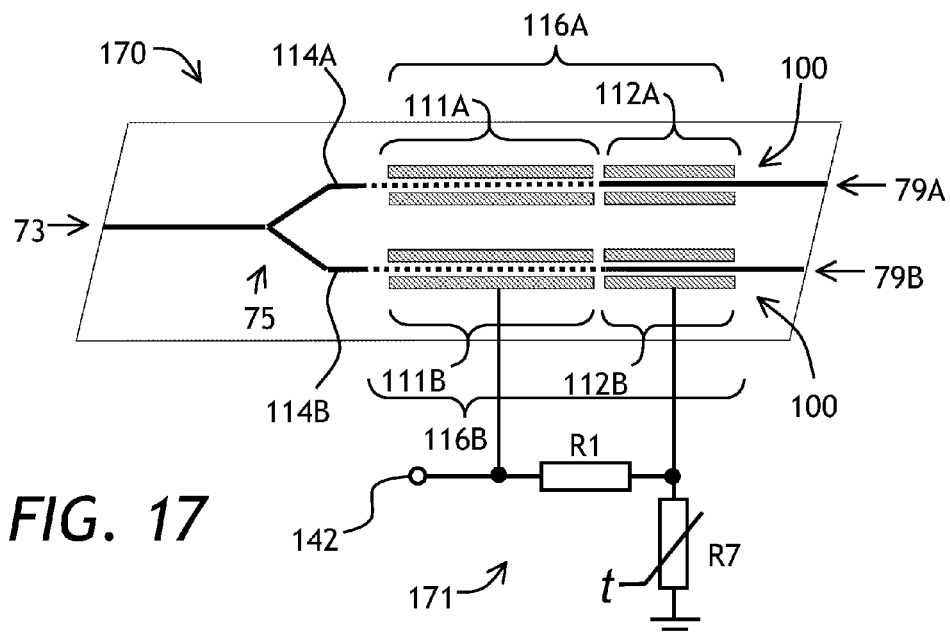
FIG. 17 is a view of the YBDPM of FIG. 13 having a resistive network including a thermally variable element.

Turning now to FIG. 17, a YBDPM 170 is similar to the YBDPM 140 of FIG. 14. A resistive network 171 of the YBDPM 170 includes a thermistor R7 instead of the resistor R2. The resistive network 171 allows the voltage of the source 142 to be redistributed in dependence on temperature. This allows for a reduction of time drift of electro-optic response of the YBDPM 170 in a broader temperature range. A resistive thermal device (RTD) can be used instead of the thermistor R7.

Figure 18:
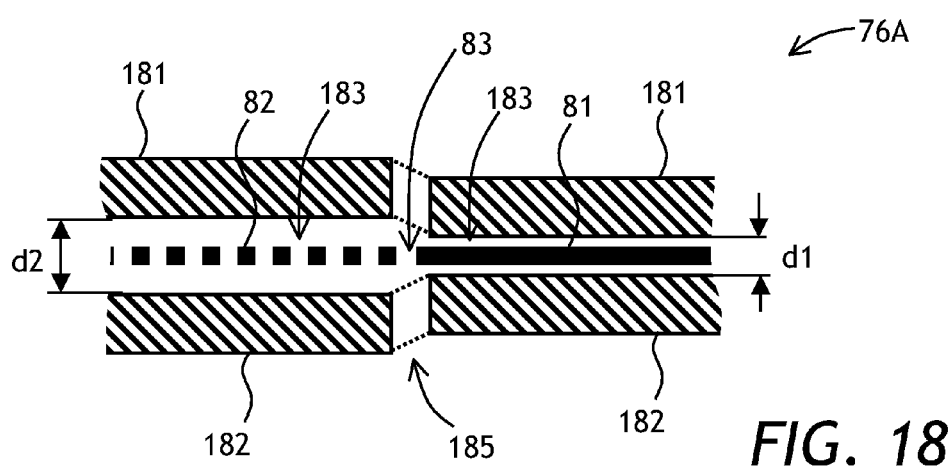
FIG. 18 is a plan view of a stitching point between two pairs of electrodes having different gap widths.

The relative strength of electrical field in waveguide portions of different types can be varied not only by segmenting the electrode structure and using an electrical network to provide different voltages to the separate segments or portions of the electrode structure, as explained above with respect to FIGS. 14 to 17, but also by varying a width of the electrode gap along the waveguide. Referring to FIG. 18, a magnified view of a stitching area of the waveguide portions 81 and 82 of the top optical phase modulator 76A of a variant of the YBDPM 88 is presented. The optical phase modulator 76A includes electrodes 181 and 182 spaced by a gap 183. The optical waveguide, including the first 81 and the second 82 waveguide portions, is disposed in the gap 183. A width of the gap 183 is d1 and d2 in the first and the second waveguide portions 81 and 82, respectively. The width d2 is bigger than d1. Accordingly, the electric field strength in the second waveguide portion 82 is smaller than in the first waveguide portion 81. In one embodiment, each of the electrodes 181 and 182 is split in two portions, as shown by dotted line at 185. An electrical network similar to that shown in FIGS. 14 to 17 can be used to further vary the electrical fields and/or frequency responses in the two waveguide portions 81 and 82. In one embodiment, stitching of APE and Ti diffusion waveguide portions is performed using procedures disclosed in the abovementioned U.S. Pat. No. 5,982,964 by Marx et al.

An optical phase modulator of the invention can be used in a variety of devices including but not limited to Mach-Zehnder interferometers, YBDPM, Y-fed Balanced Bridge Modulators, and other devices.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical phase modulator for modulating phase of an optical signal propagating therein, the optical phase modulator comprising an electro-optical substrate and an optical waveguide formed thereon or therein for guiding the optical signal,
   wherein the optical waveguide comprises first and second waveguide portions optically coupled in series at a first stitch point, wherein the first and second waveguide portions comprise first and second materials, respectively;
the optical phase modulator further comprising an electrode structure formed on or in the electro-optical substrate for creating an electric field in the first and second waveguide portions for modulating the phase,
   wherein the first and second waveguide portions are characterized, in conjunction with the electrode structure, by first and second time drifts of magnitudes of their respective electro-optical responses when the electric field is applied by the electrode structure to the first and second waveguide portions;
wherein the first and second time drifts are of opposite sign, whereby the time drift of the first waveguide portion at least partially compensates the time drift of the second waveguide portion, thereby lessening a time drift of an overall electro-optical response of the optical phase modulator.

2. The optical phase modulator of claim 1, wherein the first and second waveguide portions are diffusion-type waveguides formed by diffusion of the first and second materials, respectively, into the electro-optical substrate.

3. The optical phase modulator of claim 2, wherein the first material comprises protons, and the second material comprises titanium ions.

4. The optical phase modulator of claim 3, wherein the electro-optical substrate comprises a material selected from the group consisting of $LiNbO_3$ and $MgO:LiNbO_3$.

5. The optical phase modulator of claim 1, wherein the electro-optical substrate comprises a material selected from the group consisting of InP or GaAs.

6. The optical phase modulator of claim 3, wherein a ratio of lengths of the first and second waveguide portions, across which the electric field is created by the electrode structure, does not exceed 1:1.

7. The optical phase modulator of claim 6, wherein the ratio does not exceed 4:6.

8. The optical phase modulator of claim 1, wherein the optical waveguide further comprises a third waveguide portion optically coupled in series with the first and second waveguide portions at a second stitch point, wherein the third waveguide portion comprises a third material; wherein the electrode structure is configured for creating an electric field in the third waveguide portion for modulating the phase,
   wherein the third waveguide portion is characterized, in conjunction with the electrode structure, by a time drift of a magnitude of its electro-optical response, of an opposite sign than the time drift of the magnitude of the electro-optical response of the first waveguide portion;
wherein the time drift of the electro-optical response of the first waveguide portion is characterized by first and second time constants,
wherein the time drifts of the electro-optical response of the second and third waveguide portions are characterized by third and fourth time constants, respectively, substantially equal in magnitude to the first and second time constants, respectively, of the time drift of the electro-optical response of the first waveguide portion, whereby the time drift of the overall electro-optical response of the optical phase modulator is further lessened.

9. The optical phase modulator of claim 1, wherein the electrode structure comprises two electrodes spaced by a gap therebetween, wherein the optical waveguide is disposed in the gap, wherein a width of the gap is different in the first and the second portions of the optical waveguide.

10. The optical phase modulator of claim 1, wherein the electrode structure comprises first and second electrodes on opposite sides of the optical waveguide, the first stitch point being disposed between the first and second electrodes within the electrode structure.

11. The optical phase modulator of claim 1, wherein the electrode structure comprises first and second separate portions disposed end-to-end along the optical waveguide.

12. The optical phase modulator of claim 11, further comprising an electrical network connecting the first and second portions of the electrode structure to each other and/or to a common source of a driving electrical signal.

13. The optical phase modulator of claim 12, wherein the electrical network comprises a temperature variable component for reducing thermal dependence of the overall electro-optical response of the optical phase modulator.

14. The optical phase modulator of claim 12, wherein the electrical network comprises a resistive and/or a capacitive and/or an inductive voltage divider for dividing a voltage of the source of the electrical signal according to a ratio of lengths of the first and second waveguide portions and/or electrode gap widths at the first and second waveguide portions, so as to further reduce the time drift of the overall electro-optical response of the optical phase modulator.

15. The optical phase modulator of claim 11, wherein the first stitch point is disposed between the first and the second portions of the electrode structure.

16. The optical phase modulator of claim 15, wherein the optical waveguide further comprises a third waveguide portion optically coupled in series with the first and the second waveguide portions at a second stitch point.

17. The optical phase modulator of claim 16, wherein the second stitch point is disposed within the second portion of the electrode structure.

18. The optical phase modulator of claim 11, wherein the optical waveguide further comprises a third waveguide portion optically coupled in series with the first and the second waveguide portions at a second stitch point,
   wherein the first and second stitching points are disposed within the first and second portions, respectively, of the electrode structure.

19. A Mach-Zehnder optical interferometer comprising first and second arms each comprising an optical phase modulator of claim 1.

20. A Y-fed balanced bridge optical modulator comprising first and second arms each comprising an optical phase modulator of claim 1.

21. A Y-branch dual phase optical modulator comprising first and second output sections each comprising an optical phase modulator of claim 1.

* * * * *